No. 865,034. PATENTED SEPT. 3, 1907.
J. H. HARDMAN.
DRAFT EQUALIZER.
APPLICATION FILED JULY 20, 1906.
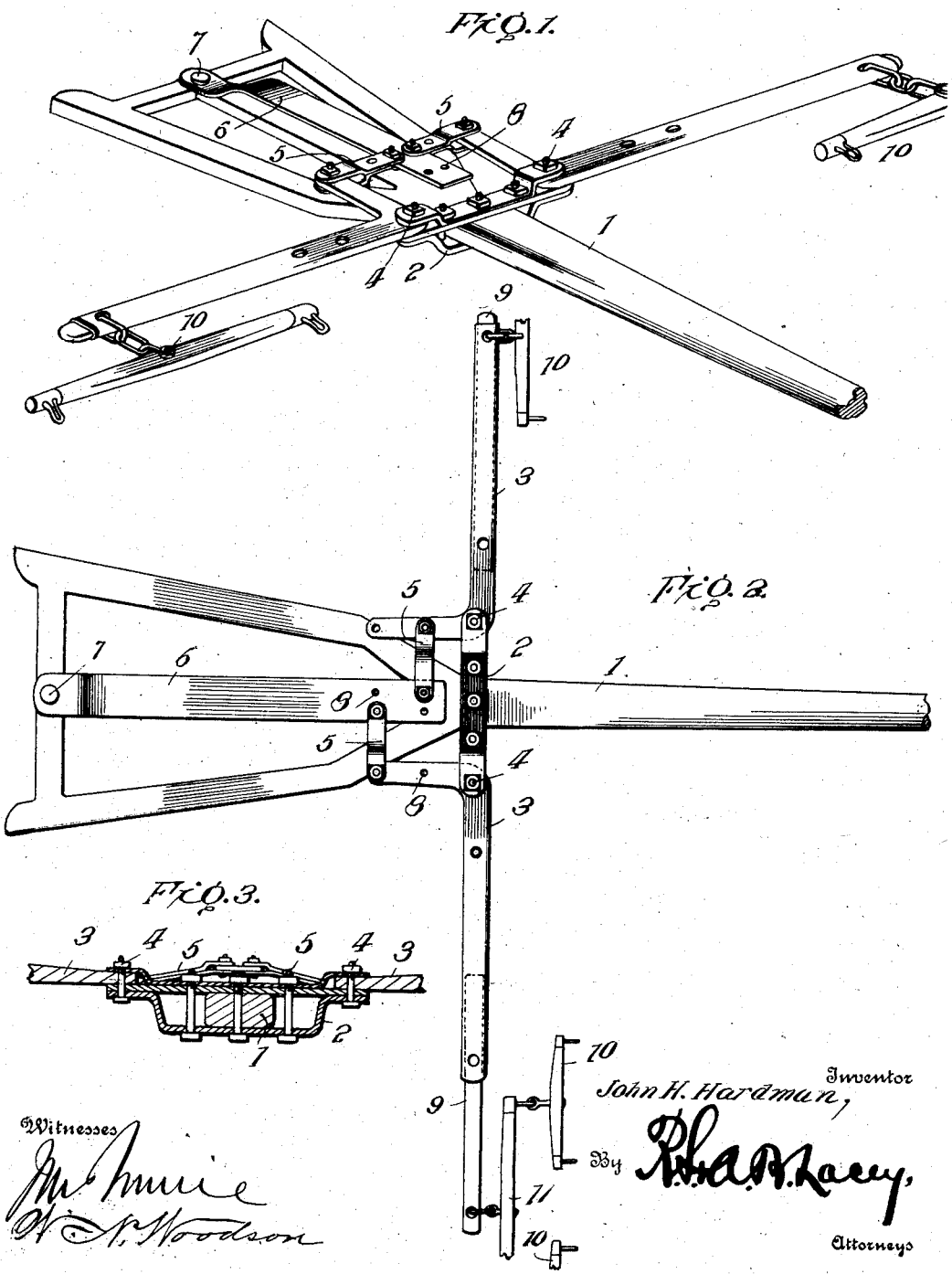

UNITED STATES PATENT OFFICE.

JOHN H. HARDMAN, OF SMITHFIELD, NEBRASKA.

DRAFT-EQUALIZER.

No. 865,034.　　　　Specification of Letters Patent.　　　　Patented Sept. 3, 1907.

Application filed July 20, 1906. Serial No. 327,080.

*To all whom it may concern:*

Be it known that I, JOHN H. HARDMAN, a citizen of the United States, residing at Smithfield, in the county of Gosper and State of Nebraska, have invented certain new and useful Improvements in Draft-Eveners, of which the following is a specification.

The object of this invention is to provide novel improvements in that class of devices commonly called draft eveners or equalizers, and the essential features of the invention reside in novel details of construction, the form and advantages for which will be pointed out clearly as the description proceeds.

For a full understanding of the invention and the merits thereof and also to acquire a knowledge of the details of construction of the means for effecting the result, reference is to be had to the following description and accompanying drawings, in which:

Figure 1 is a perspective view of a draft evener embodying the invention. Fig. 2 is a plan view showing a modified arrangement of the parts of the evener. Fig. 3 is a transverse sectional view.

Corresponding and like parts are referred to in the following description and indicated in all the views of the drawings by the same reference characters.

In the practical embodiment of the invention an evener comprising the same is applied to any conventional type of tongue 1 and consists mainly of a transverse bracket 2 applied to said tongue near the rear end portion thereof, said bracket consisting of spaced plates secured to the tongue and substantially connected by bolts or similar fastenings, opposite end portions of the bracket 2 projecting laterally from the tongue and having bell-crank levers 3 pivoted, as at 4, therebetween. The bell-crank levers 3 are equalizing levers and consist of a long arm and a short arm. The short arm of each bell-crank lever 3 is connected by a link 5 with the front end portion of an equalizing bar 6, the rear extremity of which is pivotally connected with the tongue 1 as indicated at 7. The bar 6 is arranged longitudinally of the tongue 1 and its front end portion is adapted to freely swing in a horizontal plane, such end being connected by the links 5 with the short arms of the levers 3 as above described. The front end portion of the bar 6 has a plurality of openings 8 therein and the short arms of the levers 3 have a plurality of openings, whereby the links 5 may be adjusted so as to vary the leverage of either of the equalizing levers 3 when the evener is being adjusted so as to accommodate an unequal number of draft animals upon either side of the tongue 1.

The levers 3 are of peculiar construction, the long arms 4 being hollow or tubular in order to receive extensible sections 9, whereby the long arms of the levers may be increased in length as necessary and desirable under actual conditions of service.

When the evener is being used for two draft animals, the adjustment of the parts shown in Fig. 1 is preferably utilized, wherein each animal is adapted to travel at one side of the tongue 1, swingletrees 10 being connected with the outer ends of the tubular portions of the long arms of the levers 3. Should it be desired that two draft animals walk on one side of the tongue while a single draft animal travel at the other side of the tongue, only the long arm of one lever 3 is extended, by telescopic action until it is at its outer limit of movement. The leverage of the extended lever 3 would of course be materially increased, by the above operation, and a doubletree 11 will be attached to the extended section 9 of this lever, as shown in Fig. 2 of the drawing. Suitable swingletrees 10 may be attached to the doubletree 11 in the usual way. When the leverage of the extended lever 3 is increased in the above manner, it will be obvious that in order that the pull or draft of the animals may be equalized, it is necessary to materially increase the leverage of the other lever 3. This is preferably done by adjusting the parts as shown in Fig. 2, wherein the unextended lever 3 has its link 5 connected to the bar 6 in advance of the point of connection of the other link 5. Furthermore, the link 5 having the foremost connection with the bar 6 is connected with the short arm of the adjacent lever 3 at a point nearer the fulcrum of the lever, than is the connection of the short link 5. The above arrangement or adjustment of parts will increase the leverage of the unextended lever 3 in a ratio about double the increase in the leverage obtained by the adjustment of the extended lever, and thus the draft of the single animal connected with the unextended lever 3, will equalize that of the draft of the other two animals upon the opposite side of the tongue. When it is desired that four animals be hitched to the evener, this may be readily done by extending both of the long arms of the levers 3, by adjusting the sections 9, and otherwise the arrangement of the parts may be as shown in Fig. 1. Two animals may thus walk at both sides of the tongue.

It will be noted from the foregoing description that the arrangement of parts provided by the present invention produces a peculiarly advantageous equalizing device, by reason of the fact that two coöperating but independent equalizing mechanisms are virtually secured in the unitary device. These mechanisms are connected with the opposite ends of the equalizing levers, and the first consists of the extensible members applied to the outer ends of said levers, which afford a variable equalizing mechanism. Secondly, the equalizing bar 6, and the coöperating connecting links 5 which are attached to the inner ends of the levers 3 constitute or comprise another equalizing mechanism separate and independent from that above mentioned yet coöperating therewith in order to afford a nicety of adjustment in accomplishing a desired equalization of the draft.

Having thus described the invention, what is claimed as new is:

1. In a draft evener, the combination of a tongue, a bracket carried by the tongue, bell crank equalizing levers pivotally mounted upon the bracket on opposite sides of the tongue, a draft bar extending longitudinally of the tongue and having one end pivoted thereto, link members connecting the inner ends of the equalizing levers to the draft bar, and longitudinally adjustable extensions carried by the outer ends of the equalizing levers.

2. In a draft evener, the combination of a tongue, a bracket attached to the rear end portion of the tongue, opposite equalizing levers of bell-crank form pivoted to opposite ends of the bracket aforesaid, an equalizing bar pivoted at its rear end to the tongue, and link members adjustably connected with arms of the levers and with the front end portion of the equalizing bar.

3. In a draft evener, the combination of a tongue, a bracket attached to the rear end portion of the tongue and having its opposite ends extending from opposite sides thereof, bell-crank equalizing levers pivoted to opposite ends of the bracket and embodying short and long arms, the longer arms of the bell-crank levers being tubular, sections mounted in the tubular portions of the bell-crank levers and telescopically connected therewith, a draft bar longitudinally of the tongue and having pivotal connection at its rear end therewith, and links adjustably connected with the short arms of the levers and having adjustable connection also with the front or free end portion of the draft bar aforesaid.

In testimony whereof I affix my signature in presence of two witnesses.

JOHN H. HARDMAN. [L. S.]

Witnesses:
   E. SHALLENBERGER,
   JOHN M. RAGAN, Jr.